United States Patent [19]

Joffe

[11] Patent Number: 4,787,738
[45] Date of Patent: Nov. 29, 1988

[54] HOLDER FOR OVERHEAD PROJECTION SYSTEM TRANSPARENCIES

[76] Inventor: Edward J. Joffe, 940 Park Ave., Linden, N.J. 07036

[21] Appl. No.: 107,981

[22] Filed: Oct. 14, 1987

[51] Int. Cl.$^4$ ............................................. G03B 21/00
[52] U.S. Cl. ...................... 353/120; 402/27; 353/DIG. 5
[58] Field of Search .............. 353/DIG. 5, 120, 98, 353/99; 402/55, 56, 23, 42, 27, 903

[56] References Cited

U.S. PATENT DOCUMENTS 1,344,971 6/1920 Allison .................................. 402/80
3,709,590 1/1973 Bisberg .................... 353/DIG. 5 X
4,498,746 2/1985 Wright ...................... 353/DIG. 5 X

FOREIGN PATENT DOCUMENTS 336247 10/1930 United Kingdom .................. 402/23

Primary Examiner—Harry N. Haroian
Attorney, Agent, or Firm—Peter L. Klempay

[57] ABSTRACT

A holder for a plurality of overhead projection system transparencies includes a ruler-like bar provided with suction cups for attaching the bar to the stage of the projector and U-shaped arms for engaging the holes provided along one edge of each transparency. The rear legs of the arms are rotatably received in bosses provided along the rear edge of the bar and the front legs releasably engage posts at the front edge of the bar.

8 Claims, 2 Drawing Sheets

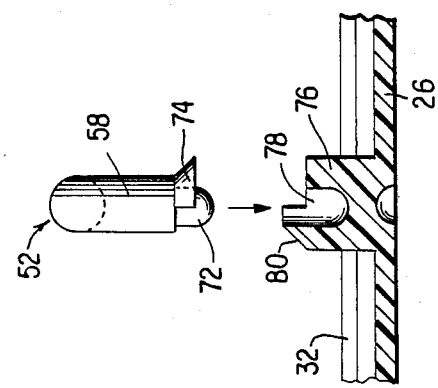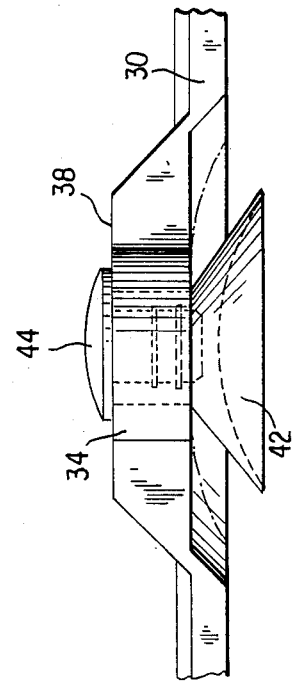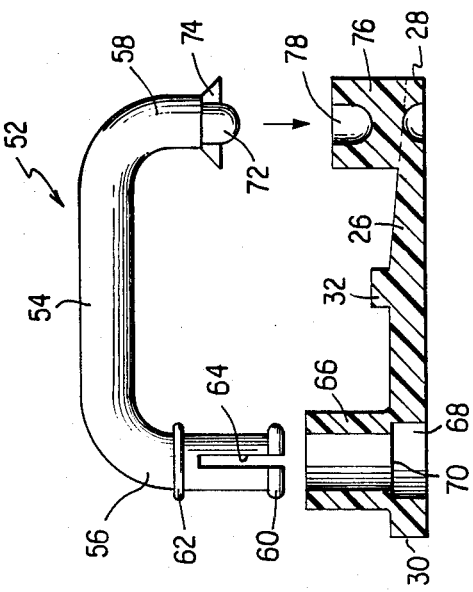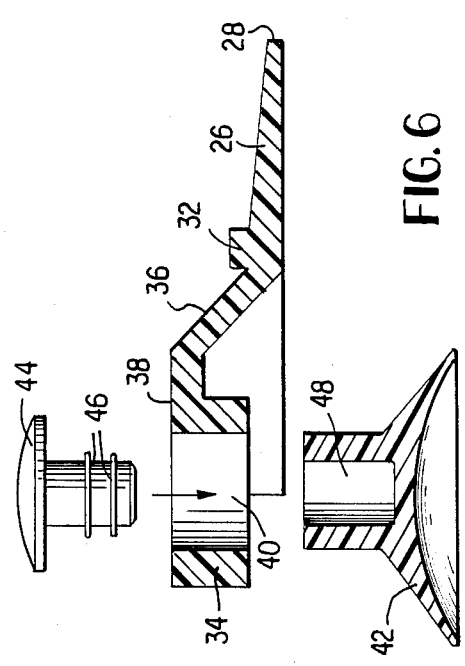

HOLDER FOR OVERHEAD PROJECTION SYSTEM TRANSPARENCIES

The present invention pertains to holders for transparencies of the type used with overhead projection equipment and, more particularly, to holders for maintaining a number of such transparencies in sequential order during both storage and projection.

BACKGROUND OF THE INVENTION

In the use of an overhead projection system, it is frequently desirable to superimpose transparencies on one another to progressively build up an image during a lecture or demonstration. While this can be done by taking successive transparencies from a loose stack, it is preferable to have the set of transparencies maintained in a group in order to preserve the desired sequence of images. A number of devices have, heretofore, been offered for this purpose. U.S. Pat. Nos. 3,600,079, Smith, Jr., et al; 3,642,359, Kitch; 3,709,590, Bisberg; 3,913,740, Bisberg; 4,203,659, Constantine et al; and 4,498,746, Wright disclose transparency holders which maintain the transparencies in an ordered set and which provide for the successive superimposing thereof.

These prior art devices include housings for storage of the transparencies when not in use and are, accordingly, of relatively complex construction. Additionally, these devices are not readily adaptable for storage of the transparencies directly with the text material related thereto.

It is the primary object of the present invention to provide a holder for overhead projection system transparencies which is of compact construction.

It is a further object of the present invention to provide such a holder for transparencies which serves to hold the transparencies in sequential order while permitting the rapid replacement or substitution of individual transparencies when desired.

Another object of the present invention is the provision of such a holder for transparencies which permits the transparencies retained by the holder to be readily stored with the accompanying textual material.

SUMMARY OF THE INVENTION

The above and other objects of the present invention which will become apparent hereinafter are achieved by the provision of a holder for overhead projection system transparencies which includes an elongated, ruler-like bar having suction cups for affixing the holder to the glass panel of an overhead projector, an upwardly projecting ridge extending the length of the bar and serving as an alignment edge for a transparency, and a number, preferably three, of U-shaped arms rotatably mounted on the bar for engaging apertures provided adjacent an edge of each transparency.

For a more complete understanding of the invention and the objects and advantages thereof, reference should be had to the following detailed description and the accompanying drawings wherein a preferred embodiment of the invention is described and illustrated.

DESCRIPTION OF THE DRAWINGS

In the drawings:

FIG. 4 is a transverse cross sectional view taken on the line 4—4 of FIG. 2, components being shown in exploded fashion for clarity;

FIG. 5 is a fragmentary longitudinal cross sectional view taken on the line 5—5 of FIG. 2, the components being shown in exploded fashion;

FIG. 6 is a transverse cross sectional view taken on the line 6—6 of FIG. 2, the components again being shown in exploded fashion; and FIG. 7 is a fragmentary rear elevational view of the holder.

DESCRIPTION OF THE PREFERRED EMBODIMENT

Figure 1:
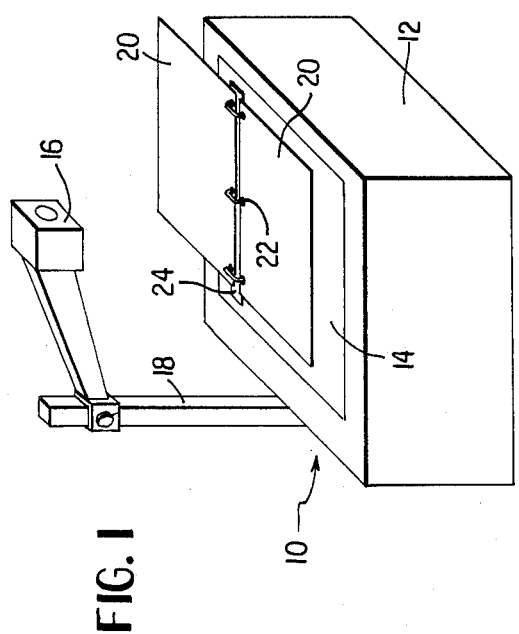
FIG. 1 is a perspective view of an overhead projector showing the use of the holder of the present invention.

A conventional overhead projector, designated generally by the reference numeral 10, is shown in FIG. 1 and includes a housing 12 for a light source (not shown), the upper face of the housing having a transparent glass or plastic panel or stage 14 for the reception of transparencies. A mirror and lens unit 16, vertically adjustable on a standard 18 attached to the housing 12, is located above the panel 14 and serves to project the image from the transparency to a vertical screen (not shown). Each transparency 20 is a rectangular plastic sheet and is provided with a series of holes 22 adjacent one of its edges. Typically, three holes are provided on the same spacing as the rings of a three ring loose leaf binder. As was discussed above, successive transparencies may be superimposed on one another to progressively build up a composite image. In order both to maintain a set of transparencies in the desired sequential order and to assure proper alignment or registry of the transparencies as they are positioned on the panel 14, the holder of the present invention, designated generally by the reference numeral 24, is attached to the panel 14 adjacent one edge thereof.

The holder 24 includes an elongated bar or slat 26, preferably of injection molded plastic, having straight, parallel front and rear edges 28 and 30, respectively, the rear portion of the slat being of uniform thickness and the forward portion tapering downwardly toward the front edge, as can be seen from FIGS. 4 and 6. A ridge 32 extends along the upper surface of the slat 26, parallel to the front edge and at approximately the longitudinal centerline of the slat.

At two spaced points along the rear edge of the bar are provided bosses 34 connected to the bar by curved, angled walls 36 and webs 38, the bosses being located above the top surface of the bar. Each of the bosses has a through bore 40 and serves to mount a suction cup 42, a pin 44 having annular ridges 46 extending through the bore and engaging the walls of the hole 48 of the shank portion of the suction cup. The height of the bosses above the surface of the bar is selected so that, when the suction cups are pressed into gripping engagement with a supporting surface, the bottom surface of the bar contacts the supporting surface, as is depicted in broken line showing in FIG. 7. It will be noted that the boss supporting walls 36 terminate in semicircular top surfaces 50 coplanar with the upper faces of the bosses. These surfaces provide convenient areas for applying thumb pressure to force the suction cups into engagement with the supporting surface and may be embossed with the legend "PUSH" to indicate this.

Figure 2:
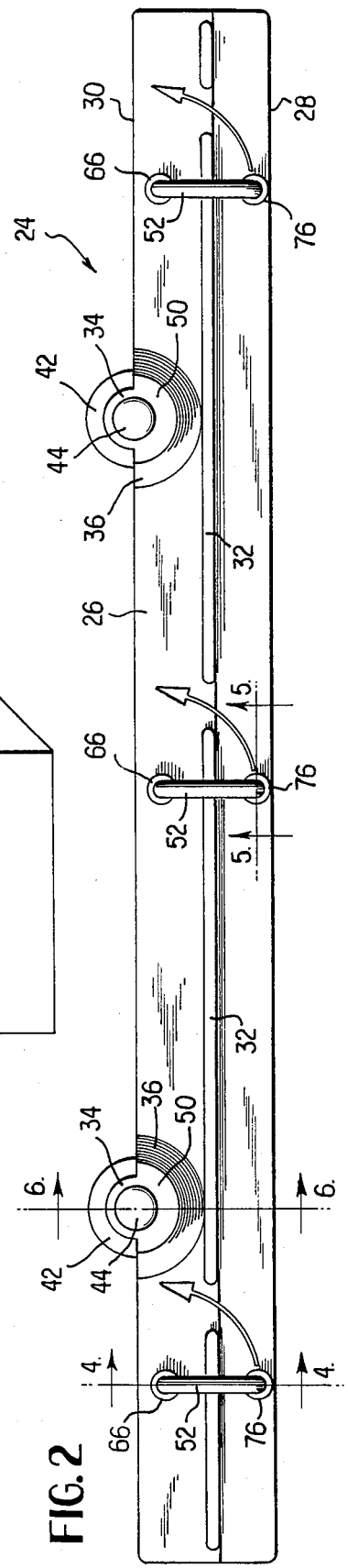
FIG. 2 is a top plan view of the holder.
Figure 3:
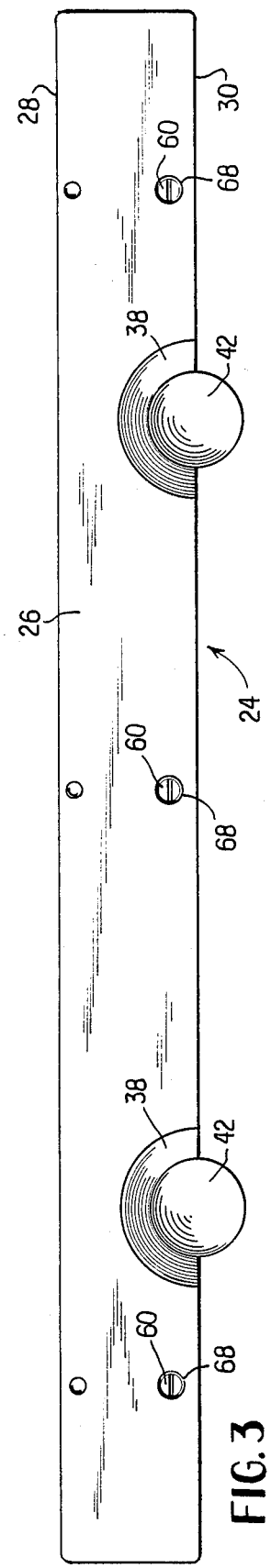
FIG. 3 is a bottom plan view of the holder.

A plurality of arms 52 are pivotally mounted on the bar 26. Preferably there are three arms which are located at the same spacings as the rings of a conventional three ring loose leaf binder. As can be seen from FIG. 4, each arm 52 is of flattened U-shape configuration having a straight center portion 54 and downwardly projecting legs 56 and 58. The first of these legs 56 is longer than the other and includes a lower annular flange 60 at the bottom thereof, an upper annular flange 62 and a diametric slit 64 extending from the bottom nearly to the upper flange. Upwardly extending bosses 66 are provided on the bar 26 adjacent the rear edge thereof at the desired mounting points for the arms 52, each of these bosses having a through bore 68 the lower portion of which is of larger diameter than the upper thus providing a shoulder 70. The arm 52 is mounted to the bar 26 by inserting the leg 56 into the corresponding boss 66, the lower end of the leg being compressed inwardly until the lower flange 60 passes the shoulder 70 and the upper flange 62 contacts the upper face of the boss. When so mounted, the arm is captive on the bar while being rotatable about the axis of the leg 56. The lower end of the second leg 58 terminates in a rounded tip 72 immediately above which is provided a semicircular flange 74, the flange extending along one side of the diameter aligned with the length of the arm. In alignment with and spaced forwardly of each of the bosses 66, the bar 26 has a mounting post 76 having a downwardly extending opening 78 and, along one half of the upper face thereof, an upwardly projecting portion 80. These mounting posts serve to retain the second legs 58 of the arms in the closed positions, the tip 72 being received in the opening 78 and the flange 74 abutting the projecting portion 80. As can be seen from FIG. 5, the upper surfaces of the flange 74 and projecting portion 80 together provide a downwardly tapering surface. When an arm 52 is to be moved to the open position, slight upward movement of the leg 58 brings the tip thereof free of the opening permitting the arm to swing counterclockwise (when viewed as in FIG. 2). Openings 82 are provided in the ridge 32 to provide clearance for the arms and curved arrows may be provided on the top face of the bar to indicate the direction of movement of the arms.

In order to load a set of transparencies 20 on the holder 24, the arms 52 are swung to the rear or open position permitting the transparencies to be stacked with the holes 22 aligned with the mounting posts 76. When the complete set of transparencies, for example, ten, has been assembled, the arms are rotated forwardly to engage the mounting posts thus retaining the transparencies on the holder. To project the transparencies, the holder 24 is attached to the glass panel 14 of the projector by means of the suction cups 42, the holder being positioned with the rear edge 30 thereof in alignment with one side of the panel. Initially the transparencies are positioned on the rear legs 56 of the arms 52 with successive ones being flipped forwardly to overlie the panel 14. As was mentioned above, the juncture of the mounting posts 76 and forward legs 58 of the arms provide a downwardly tapering surface. This serves to bring the holes of the transparency into precise registry with the body of the mounting post and, in cooperation with the ridge 32, maintain correct alignment of successive transparencies on one another. As the bottom surface of the bar is in direct contact with the panel or stage 14 and the forward portion of the bar tapers downwardly, the transparencies lie substantially flat on the projector stage, thus avoiding distortion of the image. Removal of the transparencies from the projector involves merely the release of the suction cups. The transparencies may be retained on the holder for compact storage.

While a preferred embodiment of the invention has been described and illustrated, it will be understood that changes and additions may be had therein and thereto without departing from the spirit of the invention. Reference should, accordingly, be had to the appended claims in determining the true scope of the invention.

I claim:

1. A device for holding a plurality of overhead projection system transparencies which are provided with holes along one edge thereof and for positioning the transparencies on the stage of an overhead projector comprising:
    an elongated, straight edged ruler-like bar;
    two suction cups mounted on said bar at spaced intervals adjacent one of the principal edges thereof for affixing the holder to the stage of the projector; and
    a plurality of generally U-shaped arms, each arm having a first leg retained in a bore provided in said bar adjacent said one of said principal edges for rotation about the axis of said leg and a second leg the end of which is releasably received in an opening provided in said bar adjacent the other of said principal edges thereof in transverse alignment with said bore.

2. The device of claim 1 wherein said bar includes a pair of bosses spaced upwardly from the lower surface of said bar, said bosses serving as mounting means for said suction cups, the arrangement being such that said lower surface is in contact with the stage when said suction cups are in gripping engagement therewith.

3. The device of claim 2 wherein said openings are formed in posts projecting upwardly from said bar, each post including a semicircular projection at the upper end thereof and said second leg of each said arm includes a semicircular flange immediately above the end thereof, said flanges and semicircular projections together forming a tapering surface when said legs are engaged in said openings.

4. The device of claim 1 wherein said openings are formed in posts projecting upwardly from said bar, each post including a semicircular projection at the upper end thereof and said second leg of each said arm includes a semicircular flange immediately above the end thereof, said flanges and semicircular projections together forming a tapering surface when said legs are engaged in said openings.

5. A device for holding a plurality of overhead projection system transparencies which are provided with holes along one edge thereof and for positioning the transparencies on the stage of an overhead projector comprising:
    an elongated, straight edged ruler-like bar having parallel front and rear edges;
    a plurality of U-shaped arms each having first and second legs, said first legs being connected to said bar for rotation about the axes of said first legs adjacent said rear edge thereof at locations corresponding to the holes in the transparencies, said second legs being releasably retained at points adjacent said front edge of said bar and in transverse alignment with the corresponding locations at which said first legs are retained; and
    means for releasably attaching said bar to the stage of the overhead projector.

6. The device of claim 5 wherein said bar further includes an upwardly projecting ridge extending there-along in spaced, parallel relation to said front edge thereof.

7. The device of claim 5 wherein said second leg of each arm includes a rounded tip and, immediately thereabove, a semicircular flange, and wherein said bar is provided, at each point of retainment of said second legs, with an upwardly projecting post having an opening extending therein for reception of said tip and an upwardly projecting portion complementary to said semicircular flange.

8. The device of claim 5 wherein said means for releasably attaching said bar includes at least two suction cups connected to said bar.

* * * * *